US007867599B1

(12) United States Patent
Willingham

(10) Patent No.: US 7,867,599 B1
(45) Date of Patent: Jan. 11, 2011

(54) FLOOR MAT ASSEMBLY

(76) Inventor: Matthew J. Willingham, 3719 Thistle Way, Pleasanton, CA (US) 94588

( * ) Notice: Subject to any disclaimer, the term of this patent is extended or adjusted under 35 U.S.C. 154(b) by 342 days.

(21) Appl. No.: 12/191,359

(22) Filed: Aug. 14, 2008

(51) Int. Cl.
*B32B 3/30* (2006.01)

(52) U.S. Cl. ........................ 428/119; 280/32.6; 428/192

(58) Field of Classification Search ................. 428/119, 428/157, 192; 5/420, 419, 417; 280/32.6
See application file for complete search history.

(56) References Cited

U.S. PATENT DOCUMENTS 4,029,834 A 6/1977 Bartlett
4,568,587 A 2/1986 Balzer
4,957,288 A 9/1990 Kantner et al.
D377,879 S 2/1997 Walden
6,280,817 B1 8/2001 McCrossin et al.
6,751,816 B1 6/2004 Wechsler
6,833,039 B2 12/2004 Andersen et al.

*Primary Examiner*—Alexander Thomas

(57) ABSTRACT

A floor mat assembly includes a panel that has a top side, a bottom side, and a perimeter edge extending between the top and bottom sides. The panel is flexible to allow the panel to be rolled up during storage. A perimeter wall is attached to the top side. The perimeter wall abuts and is coextensive with the perimeter edge. A depression is defined within an area bounded by the perimeter wall. A cushioning material is positioned in the depression and covering the top side of the panel. The cushioning material is comprised of a resiliently compressible material. The perimeter wall has a plurality of tool receiving wells therein that extends into an upper surface of the perimeter wall.

11 Claims, 5 Drawing Sheets

FLOOR MAT ASSEMBLY

BACKGROUND OF THE INVENTION

Field of the Invention

The present invention relates to floor mat devices and more particularly pertains to a new floor mat device for providing a storage place for tools while a person lies on the device during vehicle repair work.

SUMMARY OF THE INVENTION

The present invention meets the needs presented above by generally comprising a panel that has a top side, a bottom side, and a perimeter edge extending between the top and bottom sides. The panel is flexible to allow the panel to be rolled up during storage. A perimeter wall is attached to the top side. The perimeter wall abuts and is coextensive with the perimeter edge. A depression is defined within an area bounded by the perimeter wall. A cushioning material is positioned in the depression and covering the top side of the panel. The cushioning material is comprised of a resiliently compressible material. The perimeter wall has a plurality of tool receiving wells therein that extends into an upper surface of the perimeter wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
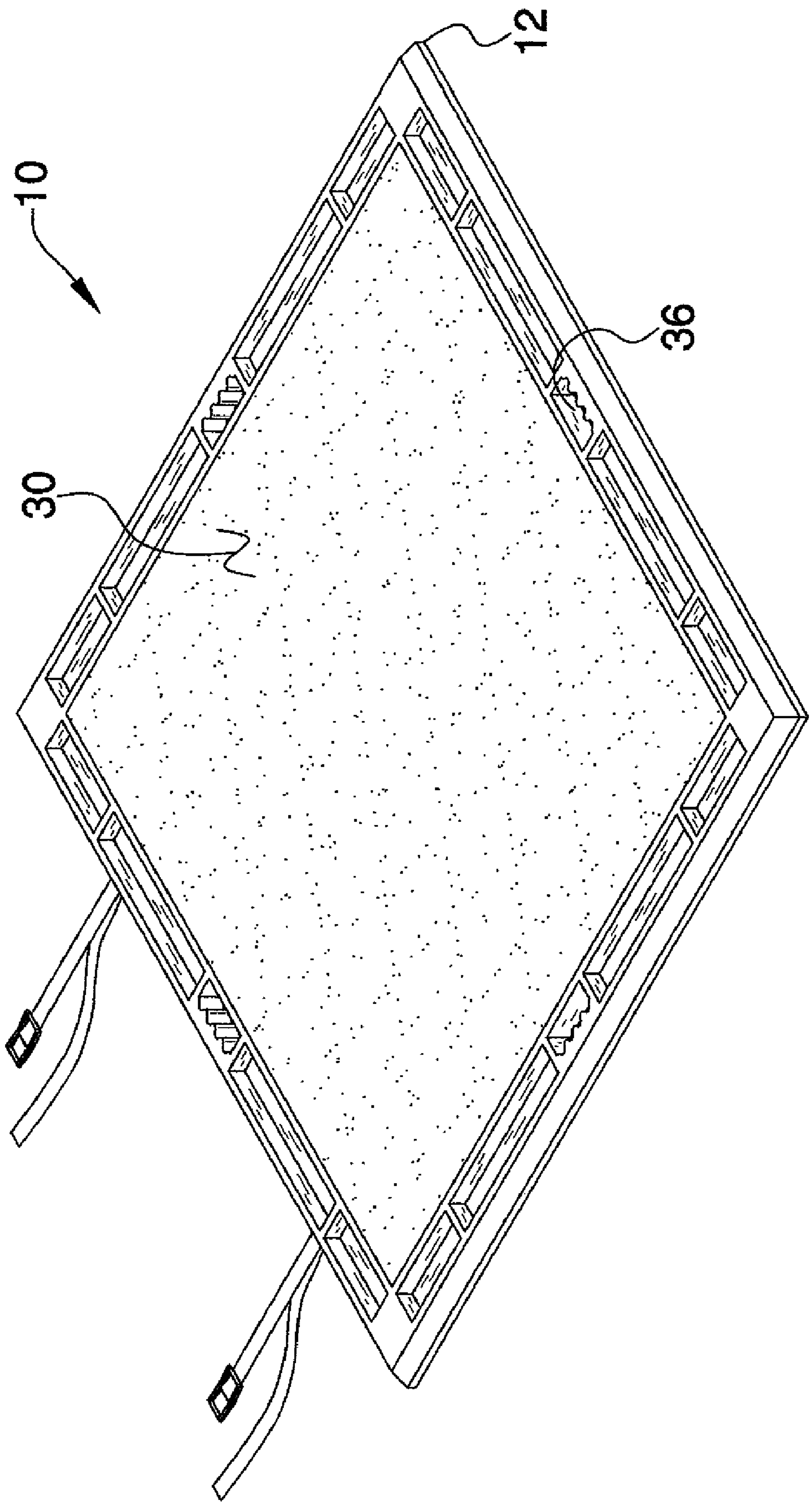
FIG. 1 is a top perspective view of a floor mat assembly according to the present invention.
Figure 2:
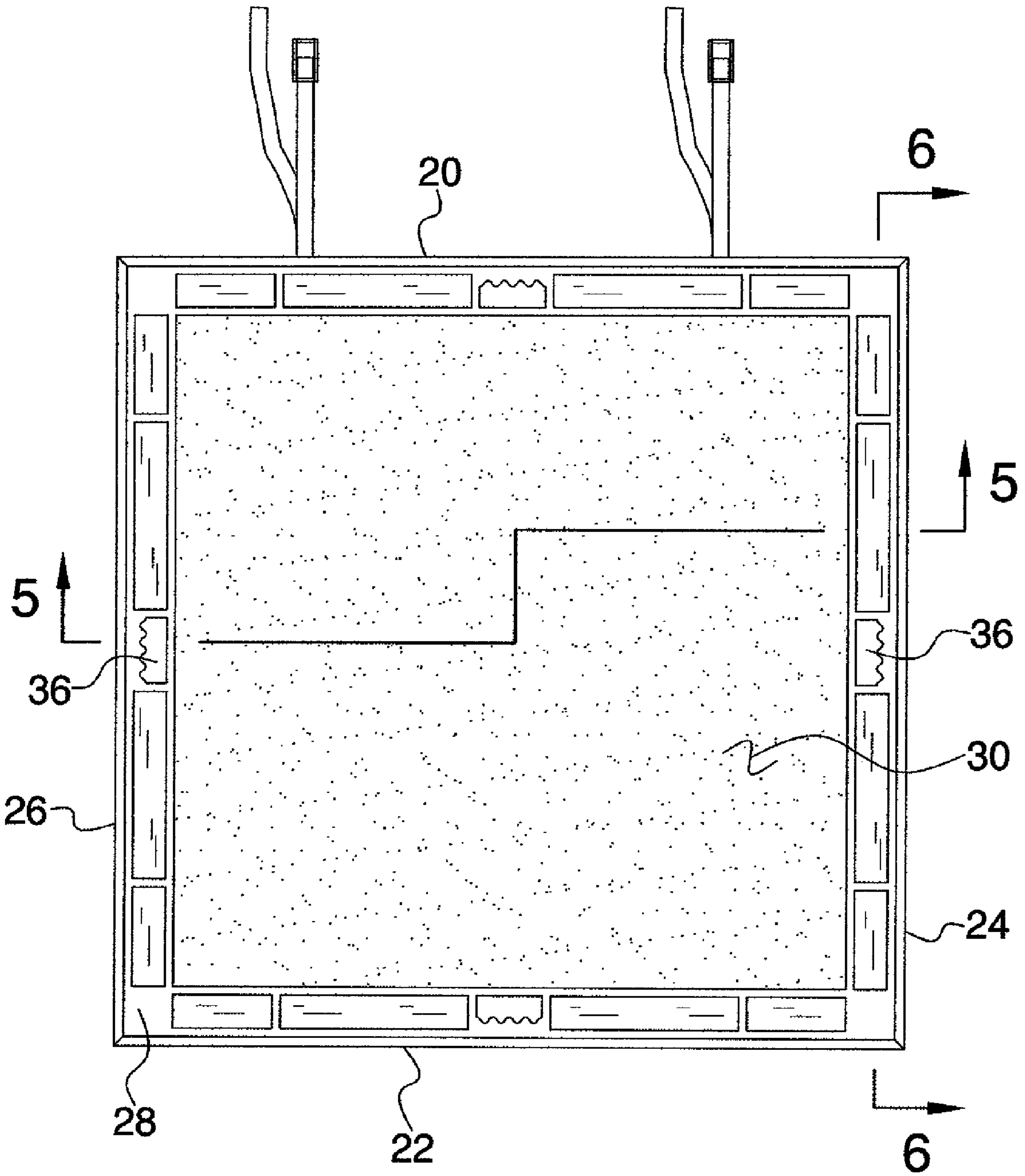
FIG. 2 is a top view of the present invention.
Figure 3:
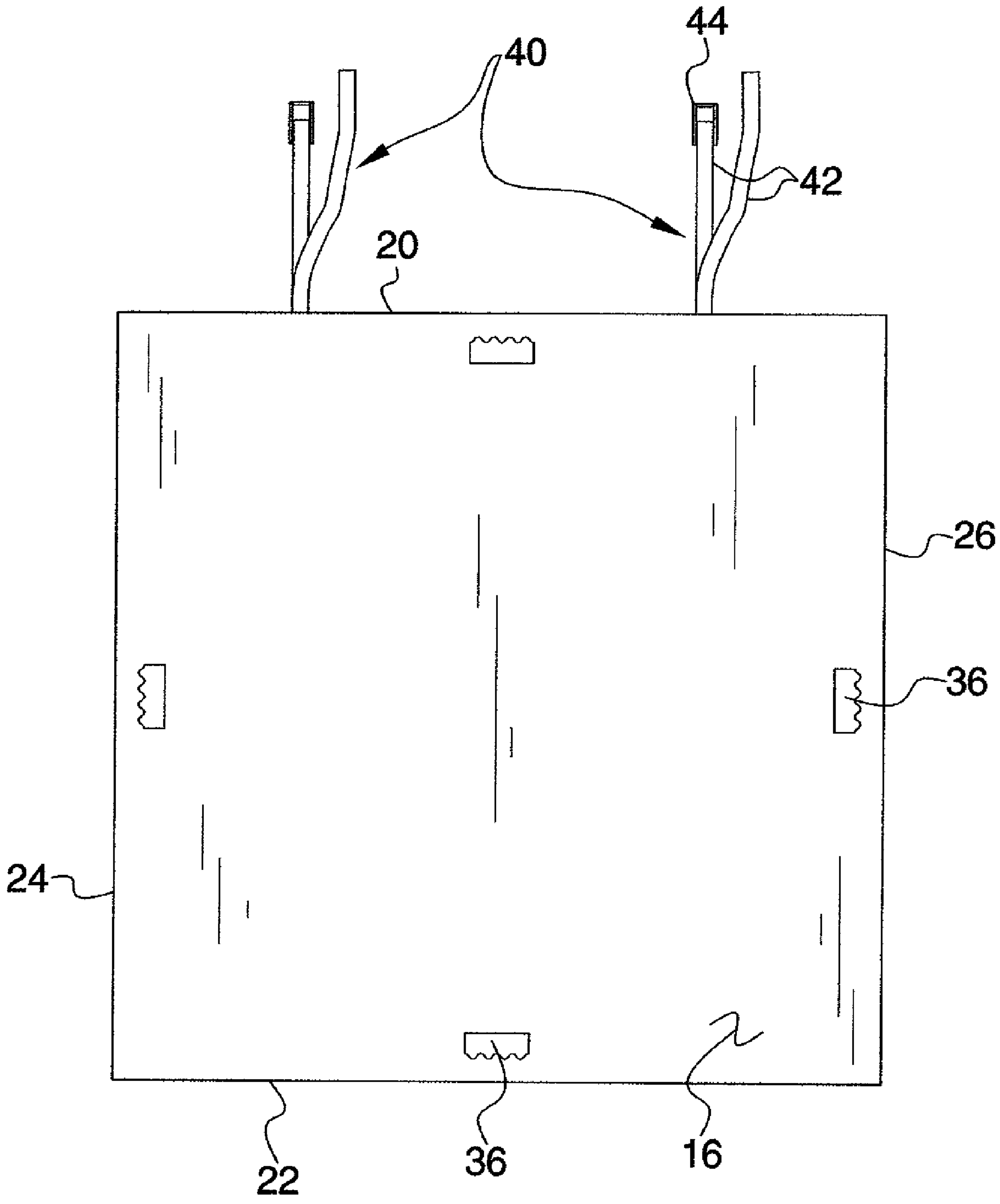
FIG. 3 is a bottom view of the present invention.
Figure 4:
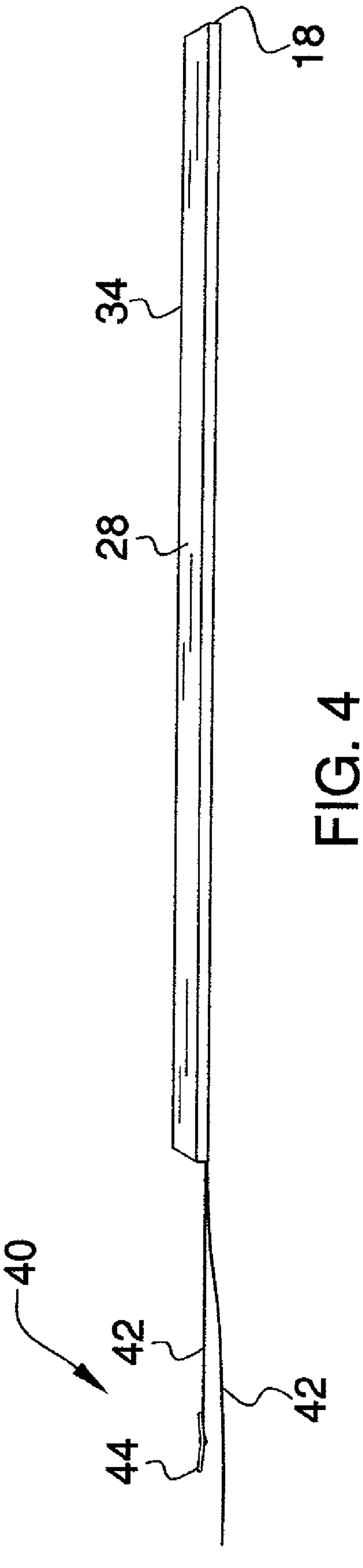
FIG. 4 is a side view of the present invention.
Figure 5:
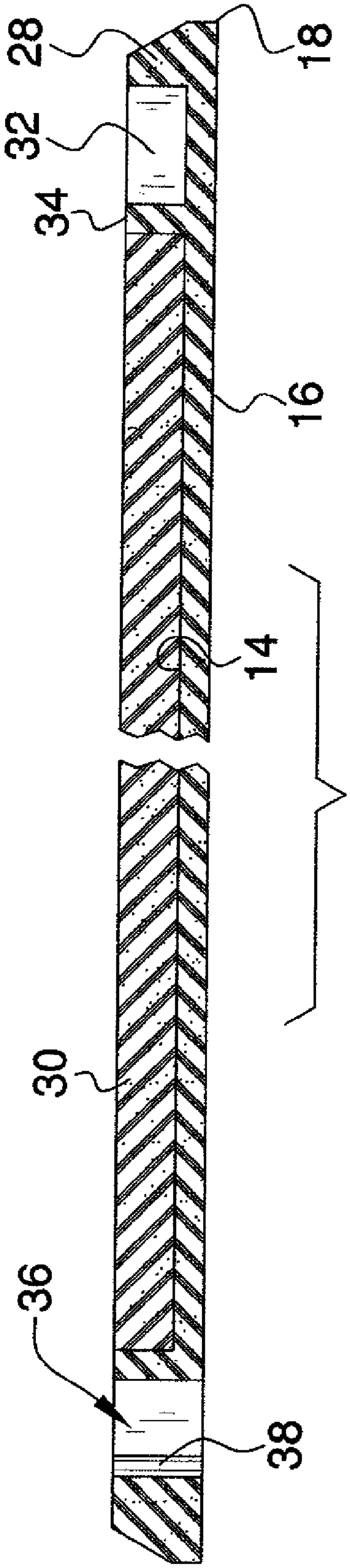
FIG. 5 is a cross-sectional view taken along line 5-5 of FIG. 2 of the present invention.
Figure 6:
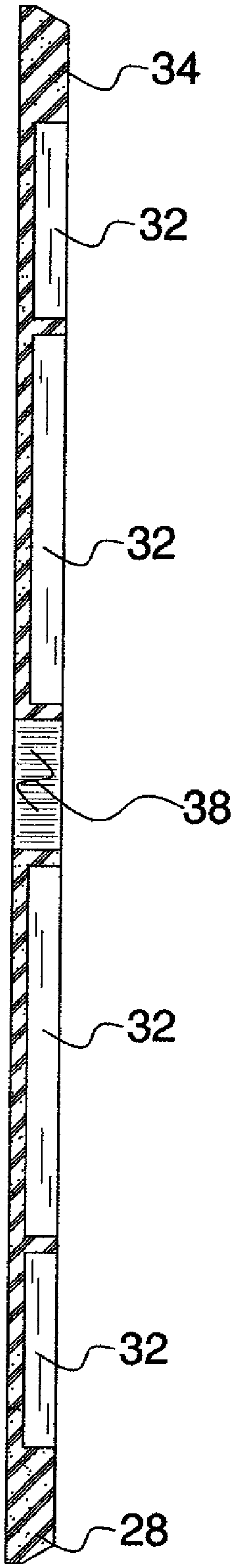
FIG. 6 is a cross-sectional view taken along line 6-6 of FIG. 2 of the present invention.

With reference now to the drawings, and in particular to FIGS. 1 through 6 thereof, a new floor mat device embodying the principles and concepts of the present invention and generally designated by the reference numeral 10 will be described.

As best illustrated in FIGS. 1 through 6, the floor mat assembly 10 generally comprises a panel 12 that has a top side 14, a bottom side 16, and a perimeter edge 18 extending between the top 14 and bottom 16 sides. The panel 12 is flexible, and may be made from an elastomeric material, to allow the panel to be rolled up during storage. The perimeter edge 18 includes a first edge 20 and a second edge 22 disposed opposite of each other and a third edge 24 and a fourth edge 26 disposed opposite of each other. The panel 12 has a length and a width each between 42 inches and 54 inches and a height less than two inches.

A perimeter wall 28 is attached to the top side 14. The perimeter wall 28 abuts and is coextensive with the perimeter edge 18. The perimeter wall 28 extends inward toward a center of the panel 12 a distance of less than 5 inches and has a height of less than 1.5 inches. A depression is defined within an area bounded by the perimeter wall 28.

A cushioning material 30 is positioned in the depression and covers the top side 14 of the panel 12. The cushioning material 30 is comprised of a resiliently compressible material. The cushioning material 30 has a height equal to or less than a height of the perimeter wall 28.

The perimeter wall 28 has a plurality of tool receiving wells 32 therein. The wells 32 extend into an upper surface 34 of the perimeter wall 28. The wells 32 include different sizes of wells, particularly of a different length, to accommodate tools of different sizes. It should be understood that the wells 32 may also be used for holding fasteners, clamps and the like.

The perimeter wall 28 has a plurality of apertures 36 extending therein and outwardly of the bottom side 16 of the panel 12. The apertures 36 each define a grip. The apertures 36 include an inner surface including finger grips 38. Each of the first 20, second 22, third 24 and fourth 26 edges has one of the apertures 36 positioned adjacent thereto.

At least one strap apparatus 40 is coupled to the first edge 20 to releasably retain the panel 12 in a rolled up configuration. FIG. 1 shows two strap apparatuses 40 being used. The strap apparatus 40 includes a pair of tethers 42, wherein one of the tethers includes an attached loop 44 to receive the other one of the tethers 42.

In use, the assembly 10 is placed under a vehicle and may be laid upon by a person working on the vehicle. The person may place a plurality of tools in the wells 32 for easy access and the wells 32 prevent the tools, fasteners or other items needed from rolling away from the person.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mat assembly for lying on while working under a vehicle, said assembly including:

a panel having a top side, a bottom side, and a perimeter edge extending between said top and bottom sides, said panel being flexible to allow said panel to be rolled up during storage;

a perimeter wall being attached to said top side, said perimeter wall abutting and being coextensive with said perimeter edge, a depression being defined within an area bounded by said perimeter wall;

a cushioning material being positioned in said depression and covering said top side of said panel, said cushioning material being comprised of a resiliently compressible material; and said perimeter wall having a plurality of tool receiving wells therein, said wells extending into an upper surface of said perimeter wall.

2. The assembly according to claim 1, wherein said perimeter edge includes a first edge and a second edge disposed opposite of each other and a third edge and a fourth edge disposed opposite of each other, said panel having a length and a width each between 42 inches and 54 inches and a height less than two inches.

3. The assembly according to claim 2, wherein said perimeter wall extends inward toward a center of said panel a distance of less than 5 inches, said perimeter wall having a height of less than 1.5 inches.

4. The assembly according to claim 3, wherein said cushioning material has a height equal to or less than a height of said perimeter wall.

5. The assembly according to claim 2, wherein said perimeter wall has a plurality of apertures extending therein and outwardly of said bottom side of said panel, said apertures each defining a grip.

6. The assembly according to claim 5, wherein said apertures each include an inner surface including finger grips.

7. The assembly according to claim 5, wherein each of said first, second, third and fourth edges having one of said apertures positioned adjacent thereto.

8. The assembly according to claim 1, wherein said wells include different sizes of wells.

9. The assembly according to claim 1, further including at least one strap apparatus being coupled to said first edge to releasably retain said panel in a rolled up configuration.

10. The assembly according to claim 8, wherein said strap apparatus includes a pair of tethers, one of said tethers including a loop to releasably receive another one of the tethers.

11. A mat assembly for lying on while working under a vehicle, said assembly including:

a panel having a top side, a bottom side, and a perimeter edge extending between said top and bottom sides, said panel being flexible to allow said panel to be rolled up during storage, said perimeter edge including a first edge and a second edge disposed opposite of each other and a third edge and a fourth edge disposed opposite of each other, said panel having a length and a width each between 42 inches and 54 inches and a height less than two inches;

a perimeter wall being attached to said top side, said perimeter wall abutting and being coextensive with said perimeter edge, said perimeter wall extending inward toward a center of said panel a distance of less than 5 inches, said perimeter wall having a height of less than 1.5 inches, a depression being defined within an area bounded by said perimeter wall;

a cushioning material being positioned in said depression and covering said top side of said panel, said cushioning material being comprised of a resiliently compressible material, said cushioning material having a height equal to or less than a height of said perimeter wall;

said perimeter wall having a plurality of tool receiving wells therein, said wells extending into an upper surface of said perimeter wall, said wells including different sizes of wells;

said perimeter wall having a plurality of apertures extending therein and outwardly of said bottom side of said panel, said apertures each defining a grip, said apertures including an inner surface including finger grips, each of said first, second, third and fourth edges having one of said apertures positioned adjacent thereto; and at least one strap apparatus being coupled to said first edge to releasably retain said panel in a rolled up configuration, one of said tethers including a loop to releasably receive another one of the tethers.

* * * * *